United States Patent
Luschi et al.

(10) Patent No.: US 8,422,607 B2
(45) Date of Patent: Apr. 16, 2013

(54) GENERATING CHANNEL ESTIMATES IN A RADIO RECEIVER

(75) Inventors: Carlo Luschi, Oxford (GB); Abdelkader Medles, Bristol (GB)

(73) Assignee: Icera Inc., Wilmington, DE (US)

( * ) Notice: Subject to any disclaimer, the term of this patent is extended or adjusted under 35 U.S.C. 154(b) by 339 days.

(21) Appl. No.: 12/808,157

(22) PCT Filed: Dec. 4, 2008

(86) PCT No.: PCT/EP2008/066775
§ 371 (c)(1),
(2), (4) Date: Aug. 4, 2010

(87) PCT Pub. No.: WO2009/077339
PCT Pub. Date: Jun. 25, 2009

(65) Prior Publication Data
US 2010/0290547 A1   Nov. 18, 2010

(30) Foreign Application Priority Data

Dec. 14, 2007   (GB) .................................. 0724416.3

(51) Int. Cl.
*H04B 7/10*   (2006.01)
(52) U.S. Cl.
USPC .......................................... 375/347; 375/350
(58) Field of Classification Search .................. 375/130, 375/142, 143, 144, 148, 152, 150, 347, 349–350
See application file for complete search history.

(56) References Cited

U.S. PATENT DOCUMENTS

| | | | | |
|---|---|---|---|---|
| 5,544,156 A | * | 8/1996 | Teder et al. | 370/342 |
| 6,442,193 B1 | * | 8/2002 | Hirsch | 375/147 |
| 2002/0196754 A1 | * | 12/2002 | Lugil et al. | 370/335 |
| 2003/0174767 A1 | * | 9/2003 | Fujii et al. | 375/229 |
| 2003/0206601 A1 | | 11/2003 | Shiu | |
| 2004/0076185 A1 | | 4/2004 | Kim et al. | |
| 2004/0105489 A1 | * | 6/2004 | Kim et al. | 375/140 |
| 2005/0195922 A1 | * | 9/2005 | Maeda et al. | 375/341 |
| 2007/0054619 A1 | * | 3/2007 | Kinnunen et al. | 455/63.1 |
| 2007/0248191 A1 | * | 10/2007 | Pettersson | 375/340 |
| 2008/0095141 A1 | * | 4/2008 | Kong et al. | 370/345 |
| 2008/0240265 A1 | * | 10/2008 | Fechtel | 375/260 |
| 2011/0085583 A1 | * | 4/2011 | Koyama | 375/147 |

FOREIGN PATENT DOCUMENTS

WO   2006045905 A1   5/2006
WO   2009077339 A2   6/2009

OTHER PUBLICATIONS

MLSE Detection with Blind Linear Prediction for Differential Space-Time Block Code Systems; IEICE Trans. Commun., vol. E90-B, No. 4 Apr. 2007; pp. 926-933.

* cited by examiner

*Primary Examiner* — Emmanuel Bayard (57) ABSTRACT

A method and system for generating channel estimates for processing signals received through first and second transmission channels in a wireless communications network, each channel corresponding to a separate transmit antenna, and each signal comprising a plurality of samples derived from symbols transmitted in the signal by: generating first variable $z_1(k)$ and second variable $z_2(k)$; and providing a set of filter coefficients (I) and generating first and second channel estimates using first and second variables and a set of filter coefficients.

21 Claims, 4 Drawing Sheets

GENERATING CHANNEL ESTIMATES IN A RADIO RECEIVER

CROSS-REFERENCE TO RELATED APPLICATIONS

This application is the National Stage of, and therefore claims the benefit of International Application No. PCT/EP2008/066775 filed on Dec. 4, 2008, entitled "GENERATING CHANNEL ESTIMATES IN A RADIO RECEIVER," which was published in English under International Publication Number WO 2009/077339 on Jun. 25, 2009, and has priority based on GB 0724416.3 filed on Dec. 14, 2007. Each of the above applications is commonly assigned with this National Stage application and is incorporated herein by reference in their entirety.

TECHNICAL FIELD

The present invention relates to a radio receiver in a wireless communications system, and to a method of generating channel estimates for processing radio signals.

BACKGROUND

The transmission of radio signals carrying data in modern wireless communications can be realized based on a number of different communications systems, often specified by a standard. Mobile radio receiver devices include analog radio frequency (RF)/intermediate frequency (IF) stages which are arranged to receive and transmit wireless signals via one or more antennas. The output of the RF/IF stage is typically converted to baseband, wherein an analog to digital converter (ADC) converts incoming analog signals to digital samples, which are then processed for signal detection and decoding of the data in the form of reliability values. The ADC may alternatively operate directly at IF, in which case the conversion to baseband is performed in the digital domain.

Figure 1:
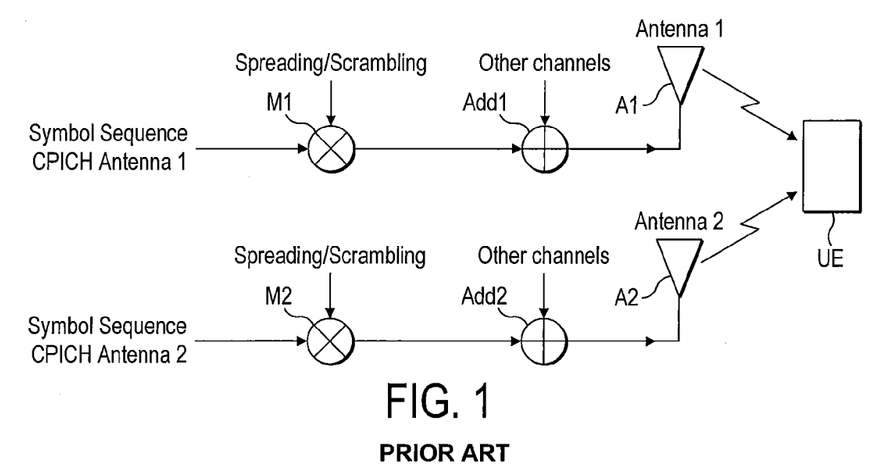
FIG. 1 is a schematic diagram illustrating transmit diversity for pilot channels.

In a wideband CDMA (wideband code division multiple access) cellular system, different physical channels are multiplexed in the code domain using separate spreading sequences called orthogonal variable spreading factor (OVSF) codes. In a case where multiple transmit antennas are used, the same spreading and scrambling codes modulate symbols transmitted from both antennas, but the symbol sequence is different. FIG. 1 is a schematic diagram illustrating two transmit antennas A1, A2. For each antenna A1, A2, a symbol sequence is supplied to a multiplier M1, M2 which multiplies a symbol sequence with a spreading/scrambling code. The transmit antennas A1, A2 are intended to transmit on the same channelization code (in the case of FIG. 1 the CPICH (common pilot channel) downlink code). An adder ADD1, ADD2 allows other channels to be added into the transmission from each of the antennas.

FIG. 1 schematically illustrates dual antenna transmission in the case where the CPICH channel comprises a plurality of pilot symbols, with the data being transmitted using the open-loop transmit diversity (space-time transmit diversity (STTD)) scheme specified by the 3GPP WCDMA system (see, e.g., the 3GPP specification TS 25.211, "Technical Specification Group Radio Access Network; Physical Channels and Mapping of Transport Channels onto Physical Channels (FDD)", December 2005), or the closed-loop transmit diversity (transmit adaptive array (TxAA)) scheme specified by the 3GGP WCDMA system (see, e.g., the 3GPP specification TS 25.214, "Technical Specification Group Radio Access Network; Physical Layer Procedures (FDD)", June 2005). The use of multiple transmit antennas requires the estimation of the channel from each transmit antenna at the receiver in the user equipment (UE).

Figure 2:
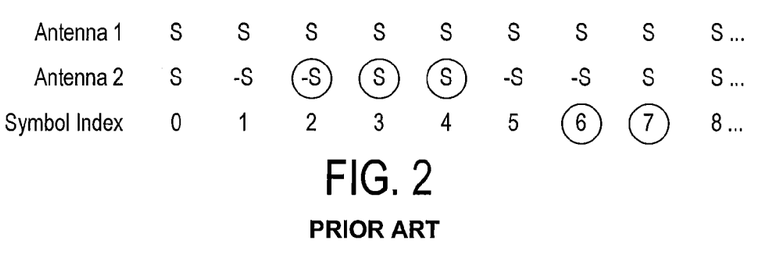
FIG. 2 is a table illustrating transmitted symbols for the pilot channels.

As shown in FIG. 1, for support of channel estimation at the user equipment (UE) receiver, a different symbol sequence is transmitted from each antenna. The modulated CPICH symbol sequence for each transmit antenna is shown in FIG. 2. The symbol S in FIG. 2 is constant, $S=(1+j)/\sqrt{2}$. The CPICH spreading factor is 256 and the same spreading and scrambling codes modulate the symbols for both antennas. Antenna A1 transmits the symbol $d_1(k)$ always equal to S, $$d_1(k)=S,$$

where antenna A2 transmits the symbol $d_2(k)$ equal to +S or −S, $$d_2(k)=\xi(k)\cdot S$$

where $$\xi(k)=(-1)^{\lfloor (k+1)/2 \rfloor},$$

and k is the symbol index counted from the CPICH frame boundary.

As can be seen from FIG. 2, the sign verifies the following property, $$\xi(2k)+\xi(2k+1)=(-1)^k+(-1)^{k+1}=0.$$

Figure 3:
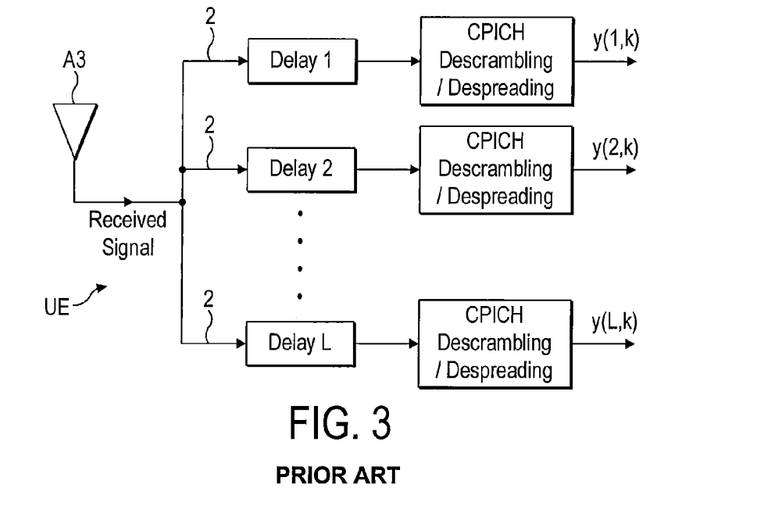
FIG. 3 is a schematic block diagram of receive circuitry.

FIG. 3 shows the descrambling/despreading circuitry of the CPICH at the UE, for different values of delay applied to the received signal samples corresponding to the taps of the channel impulse response. The circuitry comprises a set of fingers indicated by the reference numeral 2, each for descrambling a delayed version of the received signal. The signal at the output of the CPICH descrambling/despreading corresponding to the l-th delay of the channel, l=1, ..., L, is $$y(l,k)=Sh_1(l,k)+\xi(k)Sh_2(l,k)+n(l,k),$$

where $h_1(l,k)$ (respectively $h_2(l,k)$) is the channel gain from antenna A1 (respectively antenna A2) corresponding to the l-th channel delay, and k is the symbol index.

The channel estimation is performed in the same way for each value of delay. For application to the conventional rake receiver processing, the selection of the delays for which the channel estimation is performed is done in a way to capture most of the channel energy. The exact implementation of the delay selection is out of the scope of the present description and is known to a person skilled in the art.

For simplicity, in the following we will omit the delay index, so that the signal after descrambling/despreading is written as $$y(k)=Sh_1(k)+\xi(k)Sh_2(k)+n(k).$$

The estimation of the l-th channel tap is performed separately for the channel from each antenna, $h_1(k)$ and $h_2(k)$.

The problem then is how to exploit best the received pilot symbols for the channel estimation.

We introduce the variables:

$$z_1(k) = \frac{y(2k) + y(2k+1)}{2} \cdot S^*$$

$$z_2(k) = \frac{\xi(2k)y(2k) + \xi(2k+1)y(2k+1)}{2} \cdot S^*,$$

where asterisk denotes complex conjugate.

For a slowly varying channel $h_1(2k+1) \approx h_1(2k)$ and $h_2(2k+1) \approx h_2(2k)$, and due to the property $\xi(2k)+\xi(2k+1)=0$ $$z_1(k) \approx h_1(2k) + \frac{n(2k) + n(2k+1)}{2} \cdot S^*.$$

$$z_2(k) \approx h_2(2k) + \frac{\xi(2k)n(2k) + \xi(2k+1)n(2k+1)}{2} \cdot S^*.$$

Therefore, for a slowly varying channel, $z_1(k)$ (respectively $z_2(k)$) is a noisy estimate for the channel $h_1(2k)$ (respectively $h_2(2k)$).

One approach (e.g., as cited in U.S. patent application Ser. No. 10/139,904, "Transmit Diversity Pilot Processing", published November 2003) exploits the above property. The channel estimate is performed once every two CPICH symbols $$h_1(2k+1) \approx h_1(2k) = f(z_1(k+L_1), \ldots, z_1(k+1), z_1(k), z_1(k-1), \ldots, z_1(k-L_2))$$

$$h_2(2k+1) \approx h_2(2k) = f(z_2(k+L_1), \ldots, z_2(k+1), z_2(k), z_2(k-1), \ldots, z_2(k-L_2)),$$

where (•) is a filtering function, with $L_1$ and $L_2$ the length of the anti-causal and causal parts of the filter response, respectively. For an infinite impulse response (IIR) filter, the length of the causal part is infinite, $L_2 = +\infty$.

For highly time-varying channels, the approximation $h_1(2k+1) \approx h_1(2k)$ and $h_2(2k+1) \approx h_2(2k)$ are no more valid, and the above approach causes a degradation of the quality of the estimated channel.

Another method based on the estimation of the sum and the difference of the channels of the two antennas A1 and A2, is proposed in U.S. patent application Ser. No. 10/139,904, "Transmit Diversity Pilot Processing", published 6 Nov. 2003. However, the method proposed in this patent does not update the channel estimate for each antenna every CPICH symbol, and leads to an increased complexity if a finite impulse response (FIR) filter is used to improve the channel estimation. As the pattern of the received signal of the sum and the difference of the channels from the two antennas is not uniform, this requires the use of a different FIR filter depending on the position.

SUMMARY

In one aspect there is provided a method of generating channel estimates for processing signals received through first and second transmission channels in a wireless communications network, each channel corresponding to a separate transmit antenna, and each signal comprising a plurality of samples derived from symbols transmitted in the signal. The method comprises: generating a first variable $z_1(k)$ and a second variable $z_2(k)$, the first variable being a sequence of values, each k-th value being a function of the 2k-th and 2k+1-th samples and the complex conjugate of the symbol S, the second variable being a sequence of values, each k-th value being a function of the 2k-th and 2k+1-th samples, the sign of the 2k-th and 2k+1-th symbols transmitted on one of the antennas (e.g. a second one of first and second antennas) and the complex conjugate of the symbol S; and providing a set of filter coefficients $\{w(l)\}_{l=-L_1}^{L_2}$ and generating first and second channel estimates using the first and second variables and the set of filter coefficients.

According to another aspect of the invention there is provided circuitry for first and second transmission channels in a receiver of a wireless communications system. The circuitry comprises: a variable generation unit operable to generate first and second variables, the first variable being a sequence of values, each k-th value being a function of the 2k-th and 2k+1-th samples and the complex conjugate of a symbol S, the second variable being a sequence of values, each k-th value being a function of the 2k-th and 2k+1-th samples, the sign of 2k-th and 2k+1-th symbols transmitted on one of the antennas and the complex conjugate of the symbol S; storage means holding a set of filter coefficients; and means for generating first and second channel estimates for the first and second transmission channels using the set of filter coefficients and the first and second variables.

Other aspects provide a wireless receiver utilizing such circuitry, and a computer program product for implementing the method.

BRIEF DESCRIPTION OF THE DRAWINGS

For a better understanding of the present invention and to show how the same may be carried into effect, reference will now be made by way of example to the accompanying drawings in which.

DETAILED DESCRIPTION

Figure 4A:
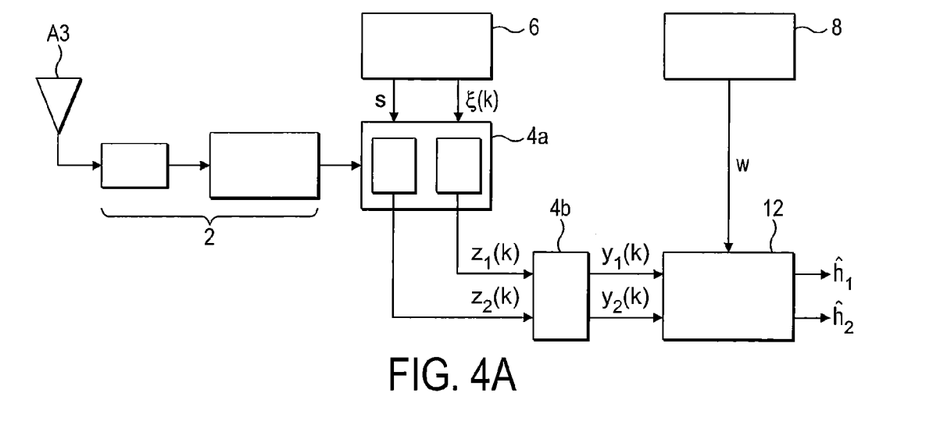
FIG. 4A is a schematic block diagram of one embodiment of the invention.

Those skilled in the art to which this application relates will appreciate that other and further additions, deletions, substitutions and modifications may be made to the described embodiments. FIG. 4A is a schematic block diagram of one embodiment of the present invention. Antenna A3 is the receive antenna at the user equipment as in FIG. 3, and reference numeral 2 denotes a single finger. In practice, there will be multiple fingers as indicated in FIG. 3. There will also be multiple samples y(k) for each delay index l, as described above with reference to the prior art, but for the sake of clarity these have been omitted from FIG. 4A and FIG. 4B and from the following description.

Figure 4B:
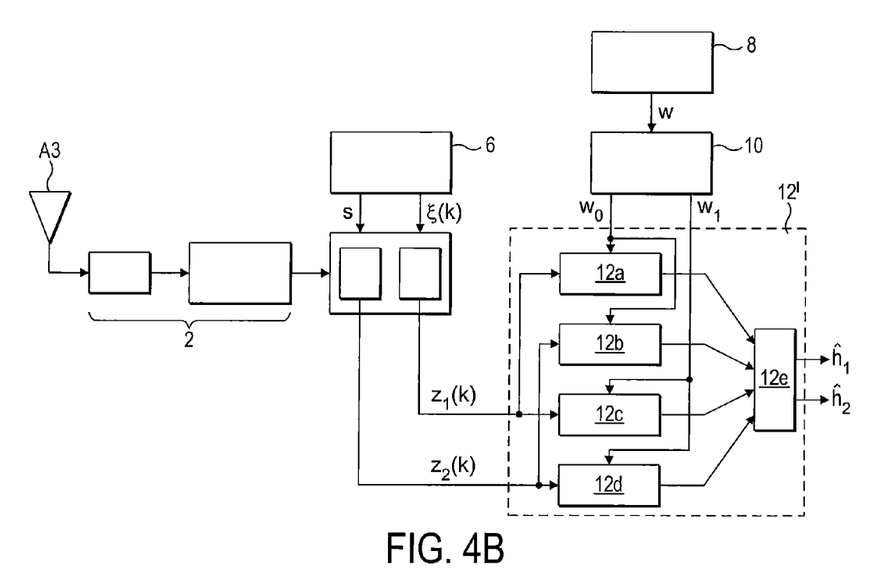
FIG. 4B is a schematic block diagram of another embodiment of the present invention.

The samples are supplied into a variable generation unit 4a which operates to generate two variables $z_1(k)$ and $z_2(k)$. In FIGS. 4A and 4B, these are shown schematically coming from different respective blocks, but this is only a diagrammatic representation. In practice, the variable generation unit 4a could be implemented as a suitably programmed processor, e.g., a processor running individual selectable code sequences. The variable generation unit 4a receives from a store 6 the constant symbol value S and the sign values $\xi(k)$. The symbol value S and the sign values $\xi(k)$ are known because they constitute the known pilot symbols that are transmitted on the CPICH channel as discussed already. The variable generation unit 4a can calculate the complex conjugate S* of the symbol S, or can receive it directly from the store 6.

The variables $z_1(k)$ and $z_2(k)$ are generated according to $$z_1(k) = \frac{y(2k) + y(2k+1)}{2} \cdot S^* \qquad \text{Equation 1}$$

$$z_2(k) = \frac{\xi(2k)y(2k) + \xi(2k+1)y(2k+1)}{2} \cdot S^*. \qquad \text{Equation 2}$$

FIGS. 4A and 4B also illustrates a filter 8 having a plurality of filter coefficients w(l). The filter can be a finite impulse response (FIR) filter, where there is a filter coefficient for each filter tap extending from $-L_1$ to $L_2$, with $L_1 < +\infty$, $L_2 < +\infty$.

In the case of a single transmit antenna (single channel) the filter corresponds for example to a low-pass Wiener filter (i.e., based on Wiener filter theory) used to improve the quality of the single-channel estimation.

With reference to FIG. 4A, the filter coefficients w(l) can be used to generate the channel estimates, by introducing the variables $y_1(k)$, $y_2(k)$ in a variable generation unit 4b $$y_1(2k) = y_1(2k+1) = z_1(k)$$

$$y_2(2k) = y_2(2k+1) = z_2(k).$$

The channel estimates $\hat{h}_1(k)$ and $\hat{h}_2(k)$ are obtained by filtering the variables $y_1(k)$ and $y_2(k)$ in a channel estimation unit 12, $$\hat{h}_1(k) = \sum_{l=-L_1}^{L_2} w(l) y_1(k-l)$$

$$\hat{h}_2(k) = \sum_{l=-L_1}^{L_2} w(l) y_2(k-l).$$

Figure 5:
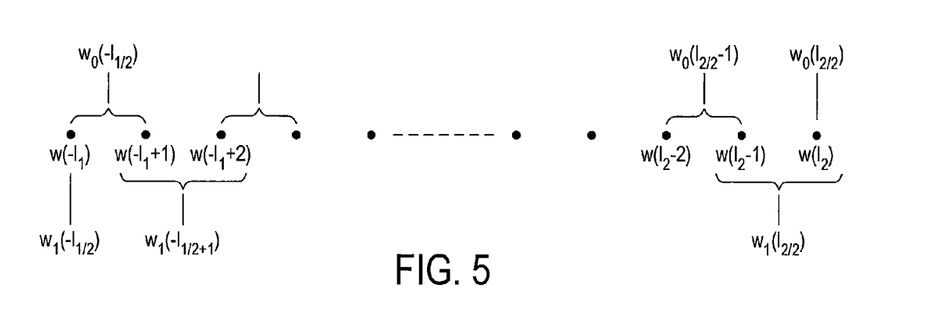
FIG. 5 illustrates derivation of new filter coefficients.

In the following, we also propose low-complexity implementations of this method as illustrated in FIG. 4B. A filter coefficient generation unit 10 receives the filter coefficients w(l) and generates new filter coefficients $w_0(l)$, $w_1(l)$ from the original filter coefficients as shown in FIG. 5, $$w_0(-L_1/2) = w(-L_1) + w(-L_1+1) \qquad w_1(-L_1/2) = w(-L_1)$$
$$\vdots \qquad w_1(-L_1/2+1) =$$
$$w(-L_1+1) + w(L_1+2)$$
$$w_0(L_2/2-1) = w(L_2-2) + w(L_2-1) \qquad \vdots$$
$$w_0(L_2/2) = w(L_2) \qquad w_1(L_2/2) = w(L_2-1) + w(L_2)$$

That is, for the filter coefficients $w_0(l)$, each adjacent pair of filter coefficients w(l) is combined until the final coefficient which is taken as a single value ($w_0(L_2/2) = w(L_2)$). For the filter coefficients $w_1(l)$, the first value is taken as a single value and then subsequent adjacent pairs of filter coefficients w(l) are combined.

The variables $z_1(k)$, $z_2(k)$ and the new filter coefficients $w_0(l)$, $w_1(l)$ are supplied to a channel estimation unit 12' which obtains respectively the channel estimates $\hat{h}_1(k)$ and $\hat{h}_2(k)$ by filtering $z_1(k)$ and $z_2(k)$ as follows:

$$\hat{h}_1(2k) = \sum_{l=-L_1/2}^{L_2/2} w_0(l) z_1(k-l), \qquad \text{Equation 3}$$

$$\hat{h}_1(2k+1) = \sum_{l=-L_1/2}^{L_2/2} w_1(l) z_1(k-l)$$

$$\hat{h}_2(2k) = \sum_{l=-L_1/2}^{L_2/2} w_0(l) z_2(k-l), \qquad \text{Equation 4}$$

$$\hat{h}_2(2k+1) = \sum_{l=-L_1/2}^{L_2/2} w_1(l) z_2(k-l)$$

In FIG. 4B, this is shown diagrammatically by the blocks 12a, 12b, 12c, 12d, where 12e is a block which represents the combining of the even (2k) and odd (2k+1) values to generate the final channel estimates $\hat{h}_1$, $\hat{h}_2$.

Figure 6:
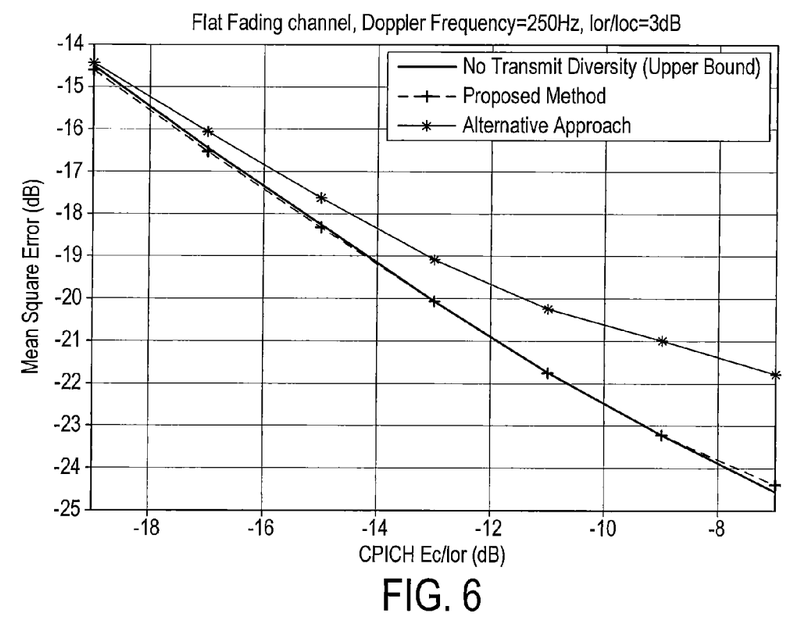
FIG. 6 is a graph showing a performance comparison.

FIG. 6 illustrates the effectiveness of the above described method. The figure shows a performance comparison in terms of channel estimation mean square error (MSE) for different CPICH chip energy (CPICH $E_c/I_{or}$). The channel is flat fading, the Doppler frequency is 250 Hz and the cell geometry $I_{or}/I_{oc} = 3$ dB. The channel estimation is performed using an FIR filter $$w = [w(-L_1) \ldots w(0) \ldots w(L_2)] = \frac{1}{9}[1\ 1\ 1\ 1\ 1\ 1\ 1\ 1\ 1],$$

with $L_1 = L_2 = 4$.

The performance of the method described herein is labeled "Proposed Method". The curve labeled "Alternative Approach" refers to the performance of the method based on the slow varying channel approximations $h_1(2k+1) \approx h_1(2k)$ and $h_2(2k+1) \approx h_2(2k)$.

For comparison, we also include the case of no transmit diversity, labeled "No Transmit Diversity", where we account for the difference in CPICH power per antenna compared to the case of transmit diversity by subtracting 3 dB. Also, in this case there is no interference between the pilot patterns transmitted from the two antennas, and therefore the resulting curve corresponds to an upper bound on the achievable performance.

The results shows that the proposed method achieves the optimal performance of the upper bound, and gives a MSE gain of 1 dB for CPICH $E_c/I_{or} = -10$ dB.

There follows a description explaining the basis for the proposed method.

Consider the new sequences $y_1(k)$ and $y_2(k)$ in which we replicate $z_1(k)$ and $z_2(k)$ for odd and even symbols indices, $$y_1(2k) = y_1(2k+1) = z_1(k)$$

$$y_2(2k) = y_2(2k+1) = z_2(k).$$

Figure 7:
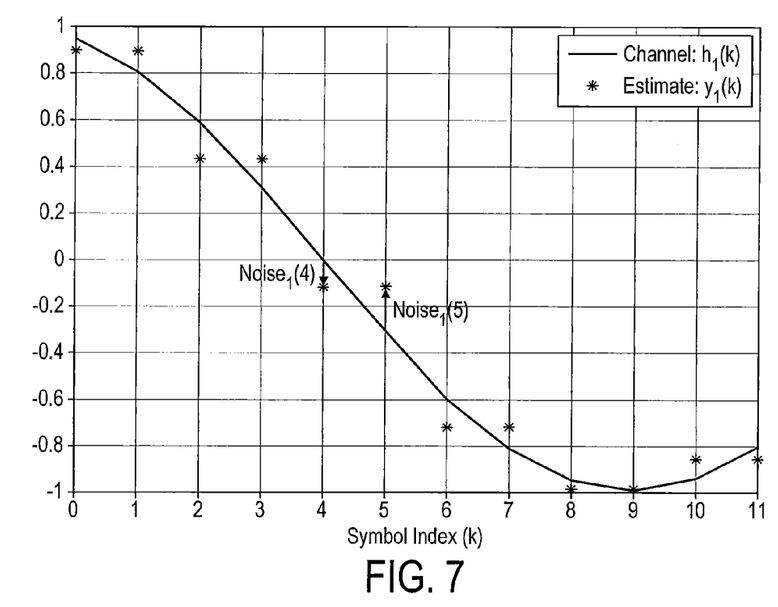
FIG. 7 illustrates a plot of one of the two transmit diversity channels versus the corresponding estimated channel values before filtering.

FIG. 7 shows an example of the actual channel $h_1(k)$ and its estimate $y_1(k)$. From the plot it is clear that, although $y_1(2k)$ and $y_1(2k+1)$ are equal, they correspond to estimates of the channel at instants 2k and 2k+1 ($h_1(2k)$ and $h_1(2k+1)$), and are affected by different noise terms:

$$y_1(2k) = h_1(2k) + \underbrace{\left\{\begin{array}{l}\frac{h_1(2k+1) - h_1(2k)}{2} + \\ \frac{\text{sign}(2k)h_2(2k) + \text{sign}(2k+1)}{2} + \\ \frac{n(2k) + n(2k+1)}{2} \cdot S^*\end{array}\right\}}_{noise_1(2k)}$$

$$y_1(2k+1) = h_1(2k+1) + \underbrace{\left\{\begin{array}{l}\frac{h_1(2k+1) - h_1(2k)}{2} + \\ \frac{\text{sign}(2k)h_2(2k) + \text{sign}(2k+1)h_2(2k+1)}{2} + \\ \frac{n(2k) + n(2k+1)}{2} \cdot S^*\end{array}\right\}}_{noise_1(2k+1)}$$

The same applies to $y_2(2k)$ and $y_2(2k+1)$:

$$y_2(2k) = h_2(2k) + noise_2(2k)$$

$$y_2(2k+1) = h_2(2k+1) + noise_2(2k+1).$$

From this perspective, the inventors noticed that the channel estimation performance can be improved by filtering the sequences $y_1(2k)$ and $y_1(2k+1)$ to generate the channel estimate, rather than applying the filtering to $z_1(k)$ and $z_2(k)$ and using the approximations $h_1(2k+1) \approx h_1(2k)$ and $h_2(2k+1) \approx h_2(2k)$ as done in the old approaches.

The inventors noted that the channel estimation using the CPICH with transmit diversity can be obtained, for each channel delay l, l=1, ..., L, according to the following procedure.

1. Calculate $z_1(k)$ and $z_2(k)$ according to $$z_1(k) = \frac{y(2k) + y(2k+1)}{2} \cdot S^*$$

$$z_2(k) = \frac{\xi(2k)y(2k) + \xi(2k+1)y(2k+1)}{2} \cdot S^*$$

2. Obtain $y_1(k)$ and $y_2(k)$ from $z_1(k)$ and $z_2(k)$ according to $$y_1(2k) = y_1(2k+1) = z_1(k)$$

$$y_2(2k) = y_2(2k+1) = z_2(k)$$

3. Obtain the channel estimates $\hat{h}_1(k)$ and $\hat{h}_2(k)$ by filtering $y_1(k)$ and $y_2(k)$ $$\hat{h}_1(k) = f(y_1(k+L_1), \ldots, y_1(k+1), y_1(k), y_1(k-1), \ldots, y_1(k-L_2))$$

$$\hat{h}_2(k) = f(y_2(k+L_1), \ldots, y_2(k+1), y_2(k), y_2(k-1), \ldots, y_2(k-L_2))$$

Depending on the specific filtering which is used, the inventors noticed that this procedure can be simplified to save complexity. In particular if an FIR filter is used, with coefficients w(l), $-L_1 \leq l \leq L_2$, $L_1 < +\infty$, $L_2 < +\infty$, filtering is performed through a simple convolution $$f(y_1(k+L_1), \ldots, y_1(k+1), y_1(k), y_1(k-1), \ldots,$$

$$y_1(k-L_2)) = \sum_{l=-L_1}^{L_2} w(l) y_1(k-l)$$

$$f(y_2(k+L_1), \ldots, y_2(k+1), y_2(k), y_2(k-1), \ldots,$$

$$y_2(k-L_2)) = \sum_{l=-L_1}^{L_2} w(l) y_2(k-l).$$

For simplicity, we assume that both $L_1$ and $L_2$ are even, and if this is not the case we can append zeros at both ends.

We define two new sets of filter coefficients $\{w_0(l)\}$ and $\{w_1(l)\}$, derived from $\{w(l)\}_{l=-L_1}^{L_2}$ as $$w_0(-L_1/2) = w(-L_1) + w(-L_1+1) \qquad w_1(-L_1/2) = w(-L_1)$$

$$\vdots \qquad w_1(-L_1/2 + 1) =$$

$$w(-L_1+1) + w(-L_1+2)$$

$$w_0(L_2/2 - 1) = w(L_2 - 2) + w(L_2 - 1) \qquad \vdots$$

$$w_0(L_2/2) = w(L_2) \qquad w_1(L_2/2) = w(L_2 - 1) + w(L_2)$$

It is now sufficient to observe that $$f(y_1(2k+L_1), \ldots, y_1(2k+1), y_1(2k), y_1(2k-1), \ldots,$$

$$y_1(2k-L_2)) = \sum_{l=-L_1/2}^{L_2/2} w_0(l) z_1(k-l)$$

$$f(y_1(2k+1+L_1), \ldots, y_1(2k+1), y_1(2k), y_1(2k-1), \ldots,$$

$$y_1(2k+1-L_2)) = \sum_{l=-L_1/2}^{L_2/2} w_1(l) z_1(k-l).$$

This new implementation of the FIR filtering requires half the number of multiplications and additions than previously.

The above-described embodiment of the present invention has the additional advantage that in the case of a single transmit antenna, the filter does not have to be replaced but can be used with its existing filter coefficients w(l). This has an advantage in that a common filter can be used in the case of single transmit antenna and multiple transmit antennas.

What is claimed is:

1. A method of generating channel estimates for processing signals received through first and second transmission channels in a wireless communications network, each channel corresponding to a separate transmit antenna, and each signal comprising a plurality of samples derived from symbols transmitted in the signal, the method comprising:
generating a first variable $z_1(k)$ and a second variable $z_2(k)$, the first variable being a sequence of values, each k-th value being a function of the 2k-th and 2k+1-th samples and the complex conjugate of a symbol S, the second variable being a sequence of values each k-th value being a function of the 2k-th and 2k+1-th samples, the sign of the 2k-th and 2k+1-th symbols transmitted on one of the antennas and the complex conjugate of the symbol S; and
providing a set of filter coefficients $\{w(l)\}_{l=-L_1}^{L_2}$ and generating first and second channel estimates using the first and second variables and the set of filter coefficients.

2. A method according to claim 1, comprising generating a third variable $y_1(k)$ and a fourth variable $y_2(k)$ by repeating in time the first variable $z_1(k)$ and the second variable $z_2(k)$, respectively; and generating the channel estimates by applying a single set of filter coefficients $\{w(l)\}_{l=-L_1}^{L_2}$ to the fourth and third variables.

3. A method according to claim 1, comprising providing a first set of filter coefficients $\{w_0(l)\}$ and a second set of filter coefficients $\{w_1(l)\}$ derived from a single set of filter coefficients $\{w(l)\}_{l=-L_1}^{L_2}$ by combining respectively adjacent pairs of said single set, the first set commencing from a first value from the single set and the second set commencing from the second value of the single set; and generating the channel estimates by applying the first and second sets of filter coefficients to the first and second variables.

4. A method according to claim 1, comprising the step of selectively using the single set of filter coefficients for generating a channel estimate in the case where a signal is received through one transmission channel from a single antenna.

5. A method according to claim 1, wherein the first and second variables are generated according to:

$$z_1(k) = \frac{y(2k) + y(2k+1)}{2} \cdot S^* \qquad \text{Equation 1}$$

$$z_2(k) = \frac{\xi(2k)y(2k) + \xi(2k+1)y(2k+1)}{2} \cdot S^*. \qquad \text{Equation 2}$$

6. A method according to claim 3, wherein the first and second filter coefficients are provided according to:

$$w_0(-L_1/2) = w(-L_1) + w(-L_1+1) \qquad w_1(-L_1/2) = w(-L_1)$$
$$\vdots \qquad w_1(-L_1/2+1) =$$
$$w(-L_1+1) + w(L_1+2)$$
$$w_0(L_2/2-1) = w(L_2-2) + w(L_2-1) \qquad \vdots$$
$$w_0(L_2/2) = w(L_2) \qquad w_1(L_2/2) = w(L_2-1) + w(L_2).$$

7. A method according to claim 3, wherein the step of generating the channel estimates comprises generating even indexes for the channel estimates using the first set of filter coefficients and generating odd indexes for the channel coefficients using the second set of filter coefficients.

8. A method according to claim 6, wherein the channel estimates are generated according to:

$$\hat{h}_1(2k) = \sum_{l=-L_1/2}^{L_2/2} w_0(l)z_1(k-l), \qquad \text{Equation 3}$$

$$\hat{h}_1(2k+1) = \sum_{l=-L_1/2}^{L_2/2} w_1(l)z_1(k-l)$$

$$\hat{h}_2(2k) = \sum_{l=-L_1/2}^{L_2/2} w_0(l)z_2(k-l), \qquad \text{Equation 4}$$

$$\hat{h}_2(2k+1) = \sum_{l=-L_1/2}^{L_2/2} w_1(l)z_2(k-l).$$

9. Circuitry for generating channel estimates for first and second transmission channels in a receiver of a wireless communications system, each channel corresponding to a separate transmit antenna, the circuitry comprising:

a variable generation unit operable to generate first and second variables, the first variable being a sequence of values, each k-th value being a function of the 2k-th and 2k+1-th samples and the complex conjugate of a symbol S, the second variable being a sequence of values, each k-th value being a function of the 2k-th and 2k+1-th samples, the sign of 2k-th and 2k+1-th symbols transmitted on one of the antennas and the complex conjugate of the symbol S;

storage means holding a set of filter coefficients; and means for generating first and second channel estimates for the first and second transmission channels using the set of filter coefficients and the first and second variables.

10. Circuitry according to claim 9, comprising a filter coefficient generation unit for providing first and second sets of filter coefficients from a single set of filter coefficients by combining respectively adjacent pairs of said single set, the first set commencing from a first value from the single set and the second set commencing from the second value of the single set.

11. Circuitry according to claim 9, comprising a further variable generation unit for generating a third variable $y_1(k)$ and a fourth variable $y_2(k)$ by repeating in time the first variable $z_1(k)$ and the second variable $z_2(k)$ respectively.

12. A wireless receiver for a communications system, the receiver comprising circuitry according to claim 9.

13. A wireless communications system comprising first and second transmit antennas each arranged to transmit signals via first and second transmission channels; and a wireless receiver according to claim 12.

14. A computer program product for generating channel estimates for processing signals received through first and second transmission channels in a wireless communications network, each channel corresponding to a separate transmit antenna, and each signal comprising a plurality of samples derived from symbols transmitted in the signal, the computer program product comprising program code embodied on a computer readable medium and configured so as when executed on a processor to:

generate a first variable $z_1(k)$ and a second variable $z_2(k)$, the first variable being a sequence of values, each k-th value being a function of the 2k-th and 2k+1-th samples and the complex conjugate of a symbol S, the second variable being a sequence of values each k-th value being a function of the 2k-th and 2k+1-th samples, the sign of the 2k-th and 2k+1-th symbols transmitted on one of the antennas and the complex conjugate of the symbol S; and provide a set of filter coefficients $\{w(l)\}_{l=-L_1}^{L_2}$ and generating first and second channel estimates using the first and second variables and the set of filter coefficients.

15. A computer program product according to claim 14, wherein the code is configured to:

generate a third variable $y_1(k)$ and a fourth variable $y_2(k)$ by repeating in time the first variable $z_1(k)$ and the second variable $z_2(k)$, respectively; and generate the channel estimates by applying a single set of filter coefficients $\{w(l)\}_{l=-L_1}^{L_2}$ to the fourth and third variables.

16. A computer program product according to claim 14, wherein the code is configured to:

provide a first set of filter coefficients $\{w_0(l)\}$ and a second set of filter coefficients $\{w_1(l)\}$ derived from a single set of filter coefficients $\{w(l)\}_{l=-L_1}^{L_2}$ by combining respectively adjacent pairs of said single set, the first set commencing from a first value from the single set and the second set commencing from the second value of the single set; and generate the channel estimates by applying the first and second sets of filter coefficients to the first and second variables.

17. A computer program product according to claim 14, wherein the code is configured to selectively use the single set of filter coefficients for generating a channel estimate in the case where a signal is received through one transmission channel from a single antenna.

18. A computer program product according to claim 14, wherein the first and second variables are generated according to:

$$z_1(k) = \frac{y(2k) + y(2k+1)}{2} \cdot S^* \quad \text{Equation 1}$$

$$z_2(k) = \frac{\xi(2k)y(2k) + \xi(2k+1)y(2k+1)}{2} \cdot S^*. \quad \text{Equation 2}$$

19. A computer program product according to claim 16, wherein the first and second filter coefficients are provided according to:

$$w_0(-L_1/2) = w(-L_1) + w(-L_1+1) \quad w_1(-L_1/2) = w(-L_1)$$

$$\vdots \quad w_1(-L_1/2+1) =$$

$$w(-L_1+1) + w(L_1+2)$$

$$w_0(L_2/2 - 1) = w(L_2 - 2) + w(L_2 - 1) \quad \vdots$$

$$w_0(L_2/2) = w(L_2) \quad w_1(L_2/2) = w(L_2 - 1) + w(L_2).$$

20. A computer program product according to claim 16, wherein the generation of the channel estimates comprises generating even indexes for the channel estimates using the first set of filter coefficients and generating odd indexes for the channel coefficients using the second set of filter coefficients.

21. A computer program product according to claim 19, wherein the channel estimates are generated according to:

$$\hat{h}_1(2k) = \sum_{l=-L_1/2}^{L_2/2} w_0(l)z_1(k-l), \quad \text{Equation 3}$$

$$\hat{h}_1(2k+1) = \sum_{l=-L_1/2}^{L_2/2} w_1(l)z_1(k-l)$$

$$\hat{h}_2(2k) = \sum_{l=-L_1/2}^{L_2/2} w_0(l)z_2(k-l), \quad \text{Equation 4}$$

$$\hat{h}_2(2k+1) = \sum_{l=-L_1/2}^{L_2/2} w_1(l)z_2(k-l).$$

* * * * *